US011617171B2

(12) United States Patent
Sakhnini et al.

(10) Patent No.: US 11,617,171 B2
(45) Date of Patent: Mar. 28, 2023

(54) TIME GAP WITH TAIL SAMPLES FOR HIGH FREQUENCY BANDS

(71) Applicant: QUALCOMM Incorporated, San Diego, CA (US)

(72) Inventors: Iyab Issam Sakhnini, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 17/134,869

(22) Filed: Dec. 28, 2020

(65) Prior Publication Data

US 2022/0210784 A1 Jun. 30, 2022

(51) Int. Cl.
*H04W 72/04* (2009.01)
*H04W 72/0446* (2023.01)
*H04L 27/26* (2006.01)

(52) U.S. Cl.
CPC ..... *H04W 72/0446* (2013.01); *H04L 27/2605* (2013.01)

(58) Field of Classification Search
CPC ............. H04B 7/2618; H04W 72/0446; H04L 27/2605
USPC .......................................................... 370/336
See application file for complete search history.

(56) References Cited

U.S. PATENT DOCUMENTS

2013/0315321 A1* 11/2013 Rajagopal ............ H04B 7/0695 375/260
2018/0295006 A1* 10/2018 Ren ....................... H04W 16/28
2018/0367355 A1 12/2018 Pan et al.
2019/0028237 A1* 1/2019 Pan ....................... H04L 1/0047
2019/0081832 A1* 3/2019 Marinier ............... H04L 5/0007
2019/0363919 A1* 11/2019 Bai ....................... H04W 36/06
2020/0244503 A1* 7/2020 Bala ...................... H04L 5/0044
2021/0321383 A1* 10/2021 Nam ..................... H04L 5/0091
2021/0321436 A1* 10/2021 Nam ..................... H04B 7/0617
2021/0328843 A1* 10/2021 Gurelli ................ H04L 27/2607
2021/0337526 A1* 10/2021 Nam ................... H04L 27/2601
2022/0014341 A1* 1/2022 Tang ..................... H04L 5/0023

OTHER PUBLICATIONS

International Search Report and Written Opinion—PCT/US2021/072084—ISA/EPO—dated Feb. 16, 2022.

(Continued)

*Primary Examiner* — Robert J Lopata
(74) *Attorney, Agent, or Firm* — Harrity & Harrity, LLP

(57) ABSTRACT

Various aspects of the present disclosure generally relate to wireless communication. In some aspects, a wireless communication device may receive, in a first time slot, a cyclic prefix (CP) at a start end of the first time slot, data content, and tail samples at a tail end of the first time slot. The wireless communication device may initiate a gap action, such as switching beams, during receipt of the tail samples, the gap action taking place within a time gap formed by at least the tail samples. The time gap may also include a CP of a second time slot that is subsequent to the first time slot. The wireless communication device may complete the gap action within the time gap. Numerous other aspects are described.

30 Claims, 12 Drawing Sheets

(56) References Cited

OTHER PUBLICATIONS

Nokia, et al., "Basic Principles for the 5G New Radio Access Technology", 3GPP TSG-RAN WG1 #84bis, 3GPP Draft, R1-163394, 3rd Generation Partnership Project (3GPP), Mobile Competence Centre, 650, Route Des Lucioles, F-06921 Sophia-Antipolis Cedex, France, vol. RAN WG1, No. Busan, Korea, Apr. 11, 2016-Apr. 15, 2016, 6 Pages, Apr. 18, 2016 (Apr. 18, 2016), XP051097178, Retrieved from the Internet: URL: http://www.3gpp.org/ftp/tsg_ran/WG1_RL1/TSGR1_84b/Docs/ [retrieved on Apr. 18, 2016] section 2.1.

* cited by examiner 200
110
120
130
284
Data Source
Transmit Processor
TX MIMO Processor
MOD
DEMOD
Comm Unit
Memory
Controller/ Processor
Scheduler
Data Sink
Receive Processor
MIMO Detector
Data Sink
Receive Processor
MIMO Detector
Data Source
Transmit Processor
TX MIMO Processor
Controller/ Processor
Memory
Comm Unit
Memory
Controller/ Processor
212
220
230
232a
232t
234a
234t
236
238
239
240
242
244
246
252a
252r
254a
254r
256
258
260
262
264
266
280
282
290
292
294

| u | 0 | 1 | 2 | 3 | 4 | 5 | 6 | 7 | 8 |
|---|---|---|---|---|---|---|---|---|---|
| SCS (kHz) | 15 | 30 | 60 | 120 | 240 | 480 | 960 | 1920 | 3840 |
| Tcp (ns) | 4687.5 | 2343.8 | 1171.9 | 585.9 | 293.0 | 146.5 | 73.2 | 36.6 | 18.3 |
| Tsymb (ns) | 66666.7 | 33333.3 | 16666.7 | 8333.3 | 4166.7 | 2083.3 | 1041.7 | 520.8 | 260.4 |

TIME GAP WITH TAIL SAMPLES FOR HIGH FREQUENCY BANDS

FIELD OF THE DISCLOSURE

Aspects of the present disclosure generally relate to wireless communication and to techniques and apparatuses for forming a time gap with tail samples for use in high frequency bands.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a wireless communication device includes receiving, in a first time slot, a first cyclic prefix (CP) at a start end of the first time slot, data content, and tail samples at a tail end of the first time slot. The method includes initiating a gap action during receipt of the tail samples, where the gap action takes place within a time gap formed by at least the tail samples, and completing the gap action within the time gap.

In some aspects, a method of wireless communication performed by a wireless communication device includes concatenating, before a discrete Fourier transform (DFT) multiplexing operation for a first communication, modulated samples for data content and fill samples. The method includes adding, after performing the DFT multiplexing operation on the concatenated samples to generate the first communication, a first CP to a start end of the first communication. The first communication may include the first CP, the data content, and tail samples that correspond to the fill samples. The method also includes transmitting the first communication in a first time slot.

In some aspects, a wireless communication device for wireless communication includes a memory and one or more processors operatively coupled to the memory, the memory and the one or more processors configured to receive, in a first time slot, a first CP at a start end of the first time slot, data content, and tail samples at a tail end of the first time slot. The one or more processors are configured to initiate a gap action during receipt of the tail samples, where the gap action takes place within a time gap formed by at least the tail samples. The one or more processors are configured to complete the gap action within the time gap.

In some aspects, a wireless communication device for wireless communication includes a memory and one or more processors operatively coupled to the memory, the memory and the one or more processors configured to concatenate, before a DFT multiplexing operation for a first communication, modulated samples for data content and fill samples. The one or more processors are configured to add, after performing the DFT multiplexing operation on the concatenated samples to generate the first communication, a first CP to a start end of the first communication, where the first communication includes the first CP, the data content, and tail samples that correspond to the fill samples. The one or more processors are configured to and transmit the first communication in a first time slot.

In some aspects, a non-transitory computer-readable medium storing a set of instructions for wireless communication includes one or more instructions that, when executed by one or more processors of a wireless communication device, cause the wireless communication device to receive, in a first time slot, a first CP at a start end of the first time slot, data content, and tail samples at a tail end of the first time slot; initiate a gap action during receipt of the tail samples, the gap action taking place within a time gap formed by at least the tail samples; and complete the gap action within the time gap.

In some aspects, a non-transitory computer-readable medium storing a set of instructions for wireless communication includes one or more instructions that, when executed by one or more processors of a wireless communication device, cause the wireless communication device to concatenate, before a DFT multiplexing operation for a first communication, modulated samples for data content and fill samples; add, after performing the DFT multiplexing operation on the concatenated samples to generate the first communication, a first CP to a start end of the first communication, where the first communication includes the first CP, the data content, and tail samples that correspond to the fill samples; and transmit the first communication in a first time slot.

In some aspects, an apparatus for wireless communication includes means for receiving, in a first time slot, a first CP at a start end of the first time slot, data content, and tail samples at a tail end of the first time slot; means for initiating a gap action during receipt of the tail samples, the gap action taking place within a time gap formed by at least the tail samples; and means for completing the gap action within the time gap.

In some aspects, an apparatus for wireless communication includes means for concatenating, before a DFT multiplexing operation for a first communication, modulated samples for data content and fill samples; means for adding, after performing the DFT multiplexing operation on the concatenated samples to generate the first communication, a first CP to a start end of the first communication, where the first communication includes the first CP, the data content, and tail samples that correspond to the fill samples; and means for transmitting the first communication in a first time slot.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
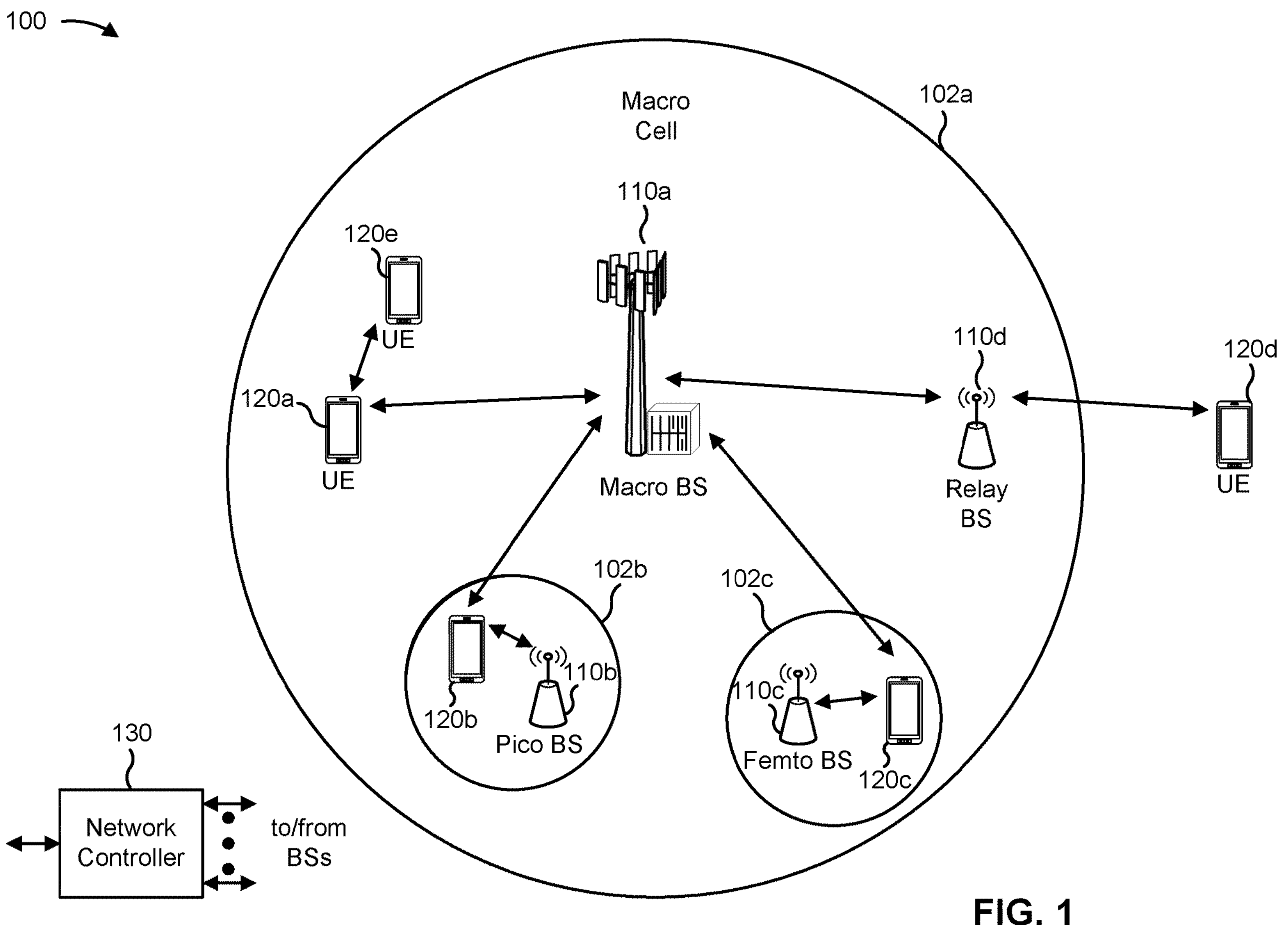
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or a wireless communication device.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by at least the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
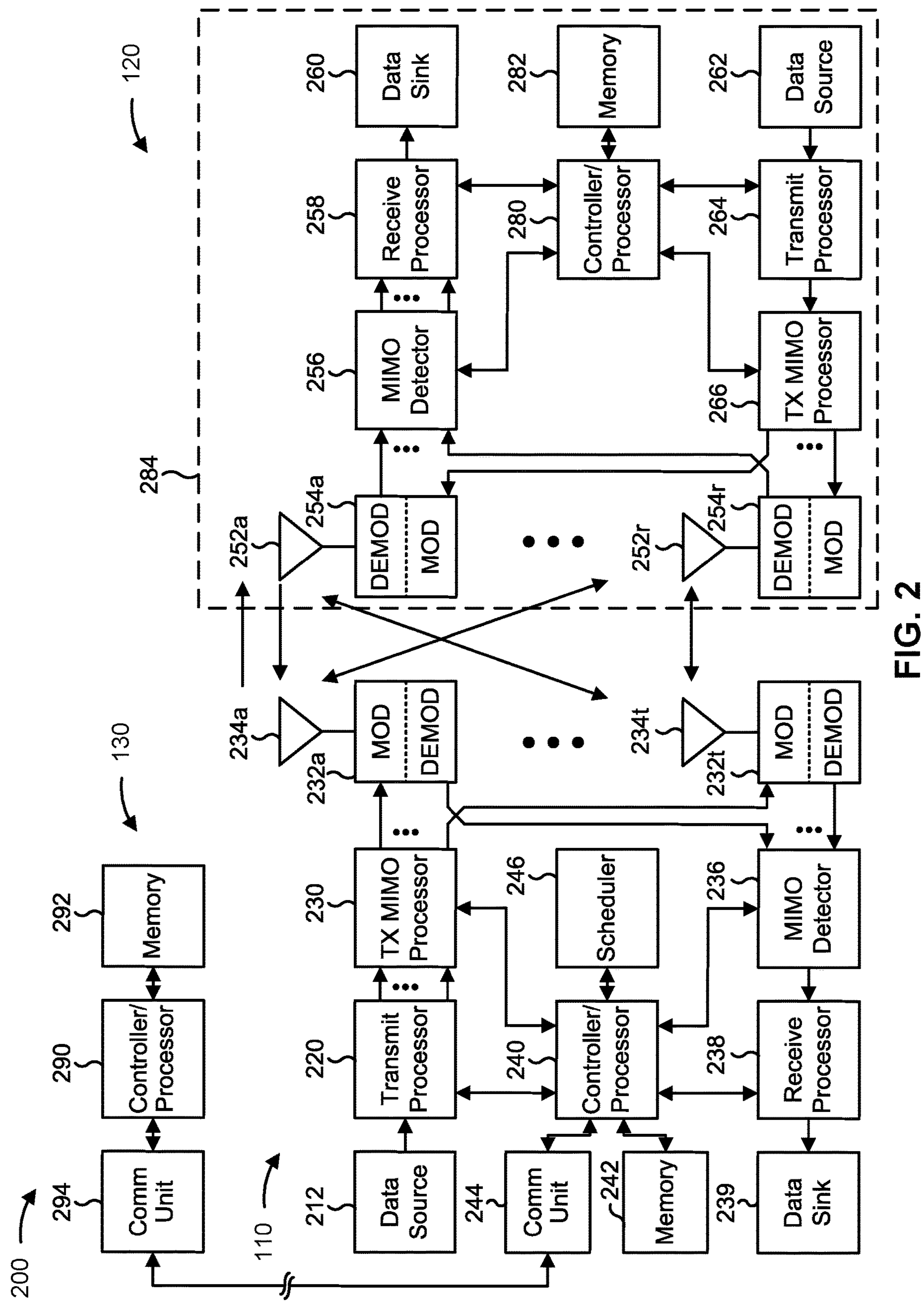
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor

266. The transceiver may be used by a processor (e.g., controller/processor 280) and memory 282 to perform aspects of any of the methods described herein, for example, as described with reference to FIGS. 1-12.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 1-12.

Controller/processor 240 of base station 110, controller/processor 280 of UE 120, and/or any other component(s) of FIG. 2 may perform one or more techniques associated with forming a time gap with tail samples for use in high frequency bands, as described in more detail elsewhere herein. In some aspects, a wireless communication device described herein is base station 110, is included in base station 110, or includes one or more components of base station 110 shown in FIG. 2. In some aspects, a wireless communication device described herein is UE 120, is included in UE 120, or includes one or more components of UE 120 shown in FIG. 2. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, a wireless communication device (e.g., base station 110, UE 120, among other examples) includes means for receiving, in a first time slot, a first CP at a start end of the first time slot, data content, and tail samples at a tail end of the first time slot; means for initiating a gap action during receipt of the tail samples, the gap action taking place within a time gap formed by at least the tail samples; and/or means for completing the gap action within the time gap. In some aspects, the means for the wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a wireless communication device (e.g., base station 110, UE 120, among other examples) includes means for concatenating, before a DFT multiplexing operation for a first communication, modulated samples for data content and fill samples; means for adding, after performing the DFT multiplexing operation on the concatenated samples to generate the first communication, a first CP to a start end of the first communication, where the first communication includes the first CP, the data content, and tail samples that correspond to the fill samples; and/or means for transmitting the first communication in a first time slot. In some aspects, the means for the wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the wireless communication device includes means for replacing, after an inverse fast Fourier transform (IFFT) operation, the tail samples with samples for reference signals.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280. The functions described with respect to the transmit processor 220, the receive processor 238, and/or the TX MIMO processor 230 may be performed by or under the control of controller/processor 240.

As indicated above, FIG. 2 is provided as an example. Other examples may differ from what is described with regard to FIG. 2.

Figure 3:
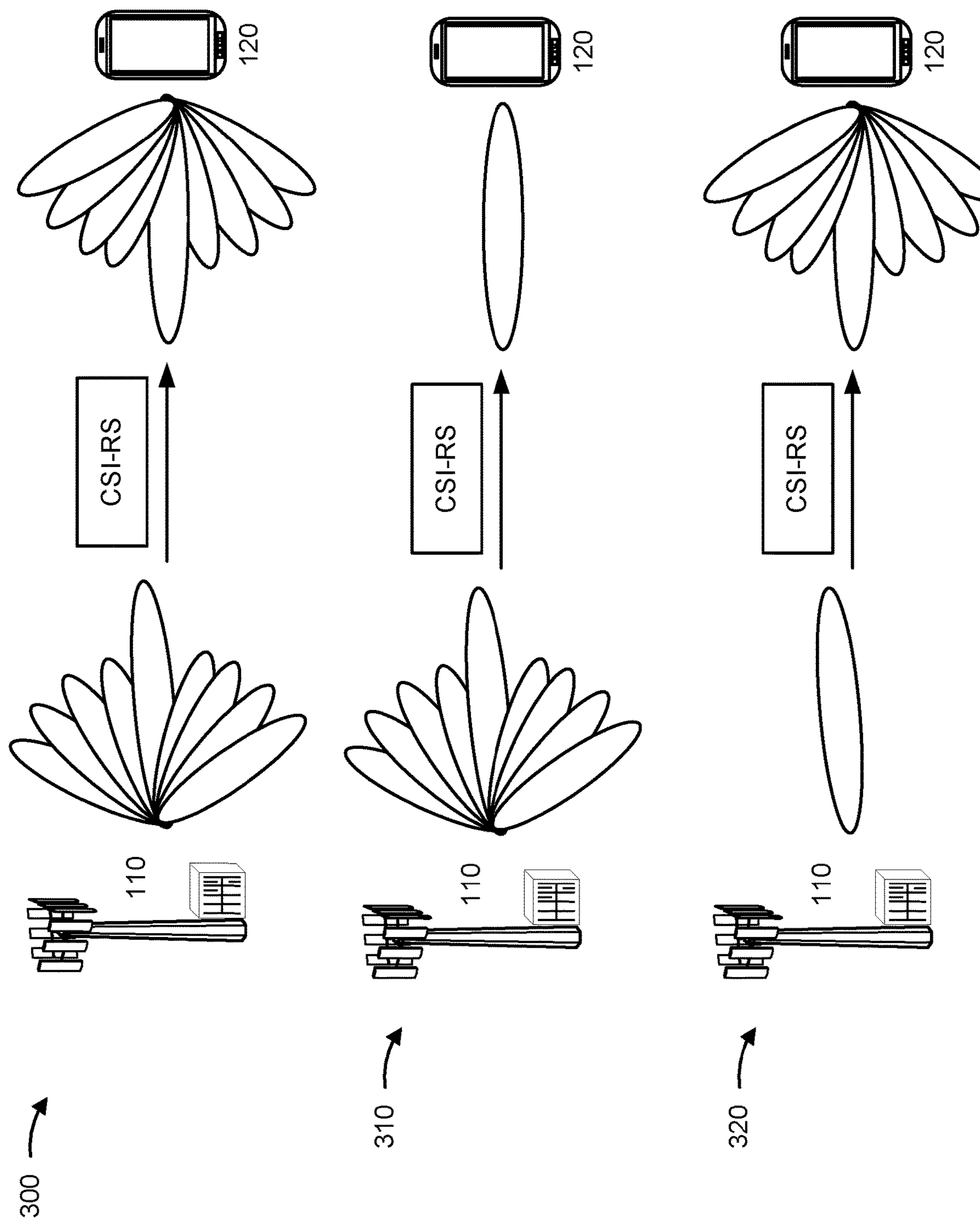
FIG. 3 is a diagram illustrating examples of channel state information reference signal beam management procedures, in accordance with various aspects of the present disclosure.

FIG. 3 is a diagram illustrating examples 300, 310, and 320 of channel state information reference signal (CSI-RS) beam management procedures, in accordance with various aspects of the present disclosure. As shown in FIG. 3, examples 300, 310, and 320 include a UE 120 in communication with a base station 110 in a wireless network (e.g., wireless network 100). However, the devices shown in FIG. 3 are provided as examples, and the wireless network may support communication and beam management between other devices (e.g., between a UE 120 and a base station 110 or transmit receive point (TRP), between a mobile termination node and a control node, between an integrated access and backhaul (IAB) child node and an IAB parent node, between a scheduled node and a scheduling node, or other wireless communication device). In some aspects, UE 120 and base station 110 may be in a connected state (e.g., a radio resource control (RRC) connected state).

As shown in FIG. 3, example 300 may include a base station 110 and a UE 120 communicating to perform beam management using CSI-RSs. Example 300 depicts a first beam management procedure (e.g., P1 CSI-RS beam management). The first beam management procedure may be referred to as a beam selection procedure, an initial beam acquisition procedure, a beam sweeping procedure, a cell search procedure, or a beam search procedure. As shown in FIG. 3 and example 300, CSI-RSs may be configured to be transmitted from base station 110 to UE 120. The CSI-RSs may be configured to be periodic (e.g., using RRC signaling), semi-persistent (e.g., using media access control control element (MAC-CE) signaling), and/or aperiodic (e.g., using downlink control information (DCI)).

The first beam management procedure may include base station 110 performing beam sweeping over multiple transmit (Tx) beams. Base station 110 may transmit a CSI-RS using each transmit beam for beam management. To enable UE 120 to perform receive (Rx) beam sweeping, the base station may use a transmit beam to transmit (e.g., with repetitions) each CSI-RS at multiple times within the same RS resource set so that UE 120 can sweep through receive beams in multiple transmission instances. For example, if base station 110 has a set of N transmit beams and UE 120 has a set of M receive beams, the CSI-RS may be transmitted on each of the N transmit beams M times so that UE 120 may receive M instances of the CSI-RS per transmit beam. In other words, for each transmit beam of base station 110, UE 120 may perform beam sweeping through the receive beams of UE 120. As a result, the first beam management procedure may enable UE 120 to measure a CSI-RS on different transmit beams using different receive beams to support selection of base station 110 transmit beams/UE 120 receive beam(s) beam pair(s). UE 120 may report the measurements to base station 110 to enable base station 110 to select one or more beam pair(s) for communication between base station 110 and UE 120. While example 300 has been described in connection with CSI-RSs, the first beam management process may also use SSBs for beam management in a similar manner as described above.

As shown in FIG. 3, example 310 may include a base station 110 and a UE 120 communicating to perform beam management using CSI-RSs. Example 310 depicts a second beam management procedure (e.g., P2 CSI-RS beam management). The second beam management procedure may be referred to as a beam refinement procedure, a base station beam refinement procedure, a TRP beam refinement procedure, a transmit beam refinement procedure, and/or the like. As shown in FIG. 3 and example 310, CSI-RSs may be configured to be transmitted from base station 110 to UE 120. The CSI-RSs may be configured to be aperiodic (e.g., using DCI). The second beam management procedure may include base station 110 performing beam sweeping over one or more transmit beams. The one or more transmit beams may be a subset of all transmit beams associated with base station 110 (e.g., determined based at least in part on measurements reported by UE 120 in connection with the first beam management procedure). Base station 110 may transmit a CSI-RS using each transmit beam of the one or more transmit beams for beam management. UE 120 may measure each CSI-RS using a single (e.g., a same) receive beam (e.g., determined based at least in part on measurements performed in connection with the first beam management procedure). The second beam management procedure may enable base station 110 to select a best transmit beam based at least in part on measurements of the CSI-RSs (e.g., measured by UE 120 using the single receive beam) reported by UE 120.

As shown in FIG. 3, example 320 depicts a third beam management procedure (e.g., P3 CSI-RS beam management). The third beam management procedure may be referred to as a beam refinement procedure, a UE beam refinement procedure, a receive beam refinement procedure, and/or the like. As shown in FIG. 3 and example 320, one or more CSI-RSs may be configured to be transmitted from base station 110 to UE 120. The CSI-RSs may be configured to be aperiodic (e.g., using DCI). The third beam management process may include base station 110 transmitting the one or more CSI-RSs using a single transmit beam (e.g., determined based at least in part on measurements reported by UE 120 in connection with the first beam management procedure and/or the second beam management procedure). To enable UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with UE 120 (e.g., determined based at least in part on measurements performed in connection with the first beam management procedure and/or the second beam management procedure). The third beam management procedure may enable base station 110 and/or UE 120 to select a best receive beam based at least in part on reported measurements received from UE 120 (e.g., of the CSI-RS of the transmit beam using the one or more receive beams).

As indicated above, FIG. 3 is provided as an example of beam management procedures. Other examples of beam management procedures may differ from what is described with respect to FIG. 3. For example, UE 120 and base station 110 may perform the third beam management procedure before performing the second beam management procedure, or UE 120 and base station 110 may perform a similar beam management procedure to select a UE transmit beam.

Figure 4:
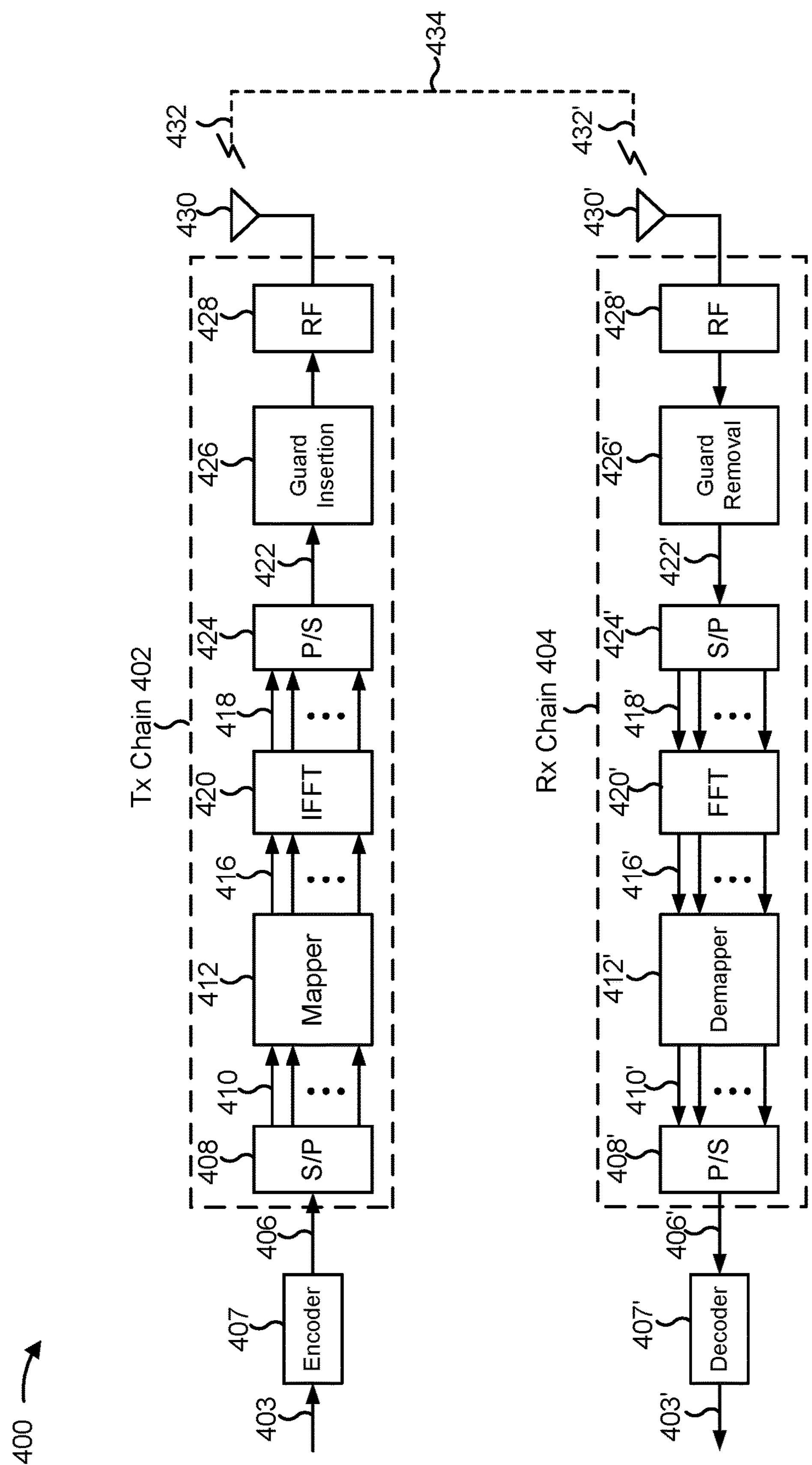
FIG. 4 is a diagram illustrating an example of a transmit chain and a receive chain of a wireless communication device, in accordance with various aspects of the present disclosure.

FIG. 4 is a diagram illustrating an example 400 of a transmit (Tx) chain 402 and a receive (Rx) chain 404 of a wireless communication device, in accordance with various aspects of the present disclosure. The wireless communication device may be a base station or UE (e.g., base station 110 or UE 120 depicted in FIGS. 1-3). In some aspects, one or more components of Tx chain 402 may be implemented in transmit processor 264, TX MIMO processor 266, MOD/DEMOD 254, controller/processor 280, and/or the like, as described above in connection with FIG. 2. In some aspects, Tx chain 402 may be implemented in UE 120 for transmitting data 406 (e.g., uplink data, an uplink reference signal, uplink control information, and/or the like) to base station 110 on an uplink channel. In some aspects, one or more components of Tx chain 402 may be implemented in transmit processor 220, TX MIMO processor 230, MOD/DEMOD 234, controller/processor 240, and/or the like, as described above in connection with FIG. 2. In some aspects, Tx chain 402 may be implemented in base station 110 for transmitting data 406 (e.g., uplink data, an uplink reference signal, uplink control information, and/or the like) to UE 120 on a downlink channel.

An encoder 407 may alter a signal (e.g., a bitstream) 403 into data 406. Data 406 to be transmitted is provided from encoder 407 as input to a serial-to-parallel (S/P) converter 408. In some aspects, S/P converter 408 may split the transmission data into N parallel data streams 410.

The N parallel data streams 410 may then be provided as input to a mapper 412. Mapper 412 may map the N parallel data streams 410 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 412 may output N parallel symbol streams 416, each symbol stream 416 corresponding to one of N orthogonal subcarriers of an IFFT component 420. These N parallel symbol streams 416 are represented in the frequency domain and may be converted into N parallel time domain sample streams 418 by IFFT component 420.

In some aspects, N parallel modulations in the frequency domain correspond to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, Ns, is equal to Ncp (the number of guard samples per OFDM symbol)+N (the number of useful samples per OFDM symbol).

The N parallel time domain sample streams 418 may be converted into an OFDM/OFDMA symbol stream 422 by a parallel-to-serial (P/S) converter 424. A guard insertion component 426 may insert a guard interval between successive OFDM/OFDMA symbols in the OFDM/OFDMA symbol stream 422. The output of guard insertion component 426 may then be upconverted to a desired transmit frequency band by a radio frequency (RF) front end 428. An antenna 430 may then transmit the resulting signal 432.

In some aspects, Rx chain 404 may utilize OFDM/OFDMA. In some aspects, one or more components of Rx chain 404 may be implemented in receive processor 258, MIMO detector 256, MOD/DEMOD 254, controller/processor 280, and/or the like, as described above in connection with FIG. 2. In some aspects, Rx chain 404 may be implemented in UE 120 for receiving data 406 (e.g., downlink data, a downlink reference signal, downlink control information, and/or the like) from base station 110 on a downlink channel. In some aspects, one or more components of Rx chain 404 may be implemented in receive processor 238, MIMO detector 236, MOD/DEMOD 234, controller/processor 240, and/or the like, as described above in connection with FIG. 2. In some aspects, Rx chain 404 may be implemented in base station 110 for receiving data 406 (e.g., uplink data, an uplink reference signal, uplink control information, and/or the like) from UE 120 on an uplink channel.

A transmitted signal 432 is shown traveling over a wireless channel 434 from Tx chain 402 to Rx chain 404. When a signal 432' is received by an antenna 430', the received signal 432' may be downconverted to a baseband signal by an RF front end 428'. A guard removal component 426' may then remove the guard interval that was inserted between OFDM/OFDMA symbols by guard insertion component 426.

The output of guard removal component 426' may be provided to an S/P converter 424'. The output may include an OFDM/OFDMA symbol stream 422', and S/P converter 424' may divide the OFDM/OFDMA symbol stream 422' into N parallel time-domain symbol streams 418', each of which corresponds to one of the N orthogonal subcarriers. A fast Fourier transform (FFT) component 420' may convert the N parallel time-domain symbol streams 418' into the frequency domain and output N parallel frequency-domain symbol streams 416'.

A demapper 412' may perform the inverse of the symbol mapping operation that was performed by mapper 412, thereby outputting N parallel data streams 410'. A P/S converter 408' may combine the N parallel data streams 410' into a single data stream 406'. Ideally, data stream 406' corresponds to data 406 that was provided as input to Tx chain 402. Data stream 406' may be decoded into a decoded data stream 403' by decoder 407'.

The number and arrangement of components shown in FIG. 4 are provided as an example. In practice, there may be additional components, fewer components, different components, or differently arranged components than those shown in FIG. 4. Furthermore, two or more components shown in FIG. 4 may be implemented within a single component, or a single component shown in FIG. 4 may be implemented as multiple, distributed components. Additionally, or alternatively, a set of components (e.g., one or more components) shown in FIG. 4 may perform one or more functions described as being performed by another set of components shown in FIG. 4.

An NR network may use large bandwidths for operating in high frequency bands. Several types of waveforms may be used for large bandwidth communications. One type of waveform may include a single carrier frequency domain waveform, such as a DFT-s-OFDM waveform. Single carrier frequency domain waveforms may have a low peak-to-average power ratio (PAPR) for better coverage and/or efficient bandwidth utilization (no guard band may be necessary). Single carrier time domain waveforms may also have low FFT complexity. On the other hand, OFDM waveforms may have efficient bandwidth utilization but with a higher PAPR and a higher spectral efficiency.

Some communications in these waveforms may use a CP, which is used to help eliminate inter-symbol interference. The CP may be a repetition of information from a previous symbol that is used as a guard against inter-symbol interference.

Figure 5:
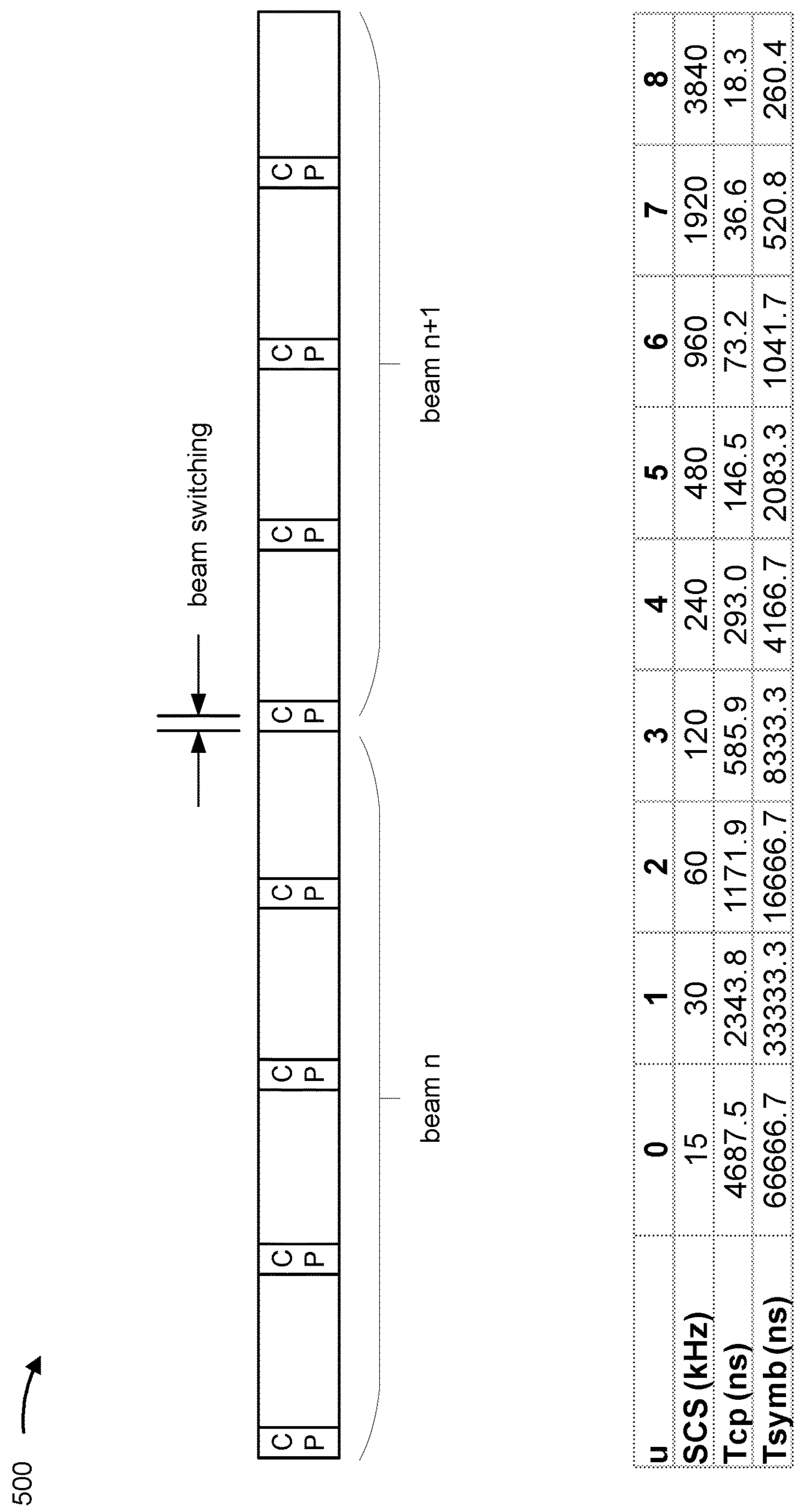
FIG. 5 is a diagram illustrating an example of a cyclic prefix for beam switching, in accordance with various aspects of the present disclosure.

FIG. 5 is a diagram illustrating an example 500 of a CP for beam switching, in accordance with various aspects of the present disclosure.

Example 500 shows a CP at a start end of each slot of a first beam (beam n) and at a start end of each slot of a second beam (beam n+1). The slot may be a symbol in duration or multiple symbols in duration. The slots may be for synchronization signal blocks (SSBs) or other FFT data. The CP at the start of each slot may provide a time gap for beam switching. Beam switching may take about 100 nanoseconds (ns).

NR may use a variety of frequency ranges. One frequency range that is considered for use in NR is the Frequency Range 4, which may have a range of approximately 52 GHz to approximately 114.25 GHz, and which may use licensed bands, unlicensed bands, or a combination of licensed bands and unlicensed bands.

For higher frequency bands, including frequency bands exceeding 100 GHz, a subcarrier spacing (SCS) may be increased (e.g., 960 kHz, 1920 kHz, 3480 kHz) to combat phase noise and to increase the overall channelization bandwidth with a manageable FFT size. However, as the SCS increases, a time duration of a symbol (Tsymb) and a time duration of a CP (Tcp) may decrease proportionally. Example 500 shows a table of increasing SCS sizes, where Tcp and Tsymb decrease as the SCS size increases. If Tcp falls below 100 ns, the time for beam switching (e.g., 100 ns)

may not be absorbed by the CP of a symbol. Without an additional explicit gap, the beam switching may not complete before the data content of the symbol is to begin. One solution to provide more switching time is to skip a symbol to allow for beam switching, but this wastes time and signaling resources. Another solution is to vary a size of the CP as needed. However, this means that FFT sizes may be different for different symbols. A receiver may have to be configured to handle multiple FFT sizes, which complicates receiver design and increases overhead.

According to various aspects described herein, a transmitting device (e.g., a transmitting wireless communication device) may concatenate, before a DFT multiplexing operation for a first communication, modulated samples for data content and fill samples. The fill samples may be, for example, zeros (zero samples). The transmitting device may add, after the DFT operation, a CP. The first communication may thus include a CP at a start of the first communication, data content, and tail samples at an end of the first communication. A receiving device (e.g., a receiving wireless communication device) may receive the first communication and use a time gap formed by at least the tail samples to start a gap action, such as beam switching or transitioning from downlink reception to uplink transmission. In some aspects, the time gap may be formed by only tail samples. In some aspects, the time gap may be formed by at least the tail samples and also by a CP at a start of a second communication in a subsequent time slot (e.g., symbol). The receiving device may complete the gap action within the time gap, which may be greater in length than a single CP. In this way, the receiving device may have enough time to switch beams, switch carriers, or perform another gap action. As a result, the receiving device may transmit or receive the second communication without use of an explicit gap in between time slots and may conserve time and signaling resources. CP sizes may also remain consistent and thus additional overhead is avoided.

As indicated above, FIG. 5 provides some examples. Other examples may differ from what is described with regard to FIG. 5.

Figure 6:
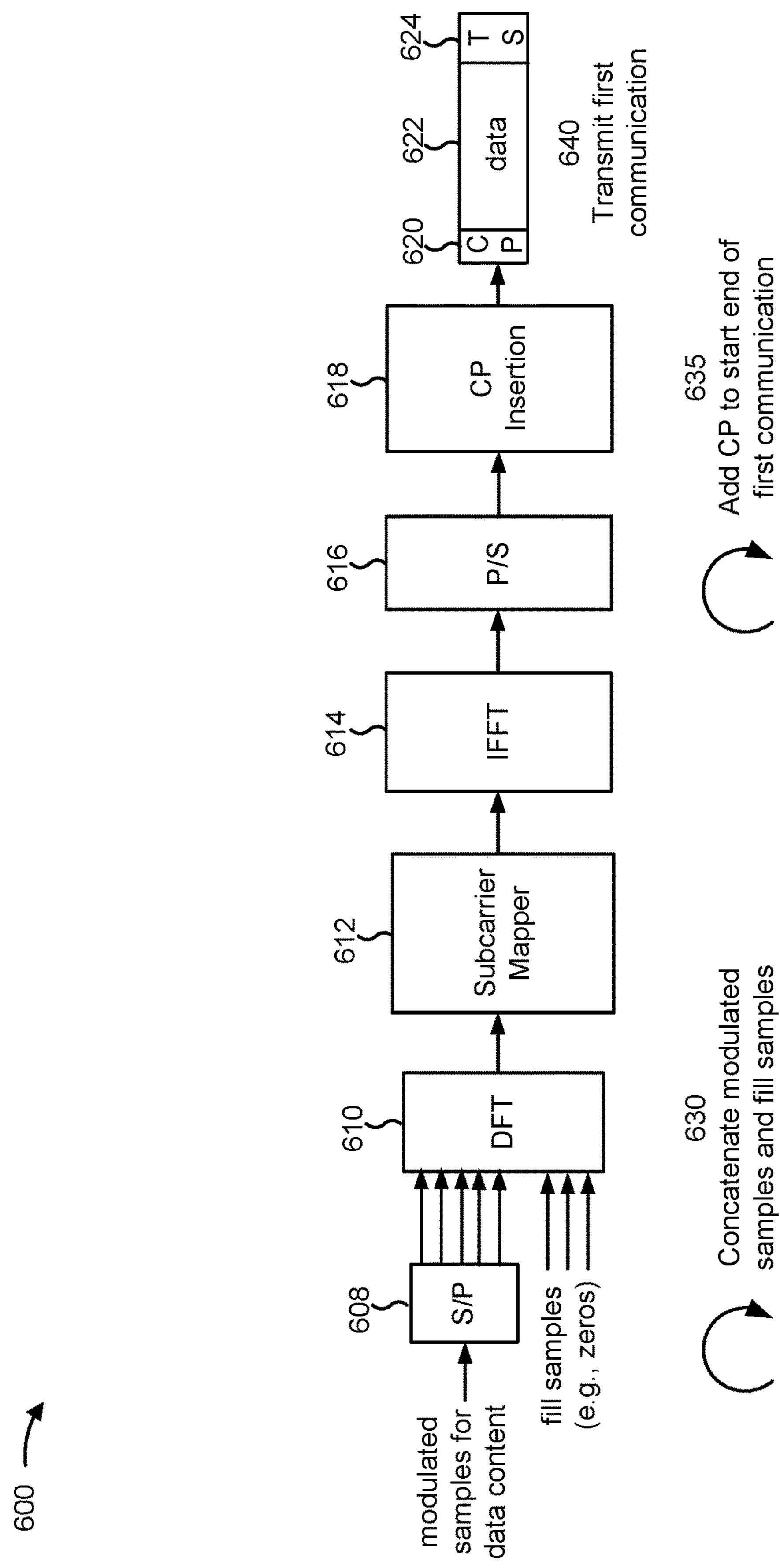
FIG. 6 is a diagram illustrating an example of forming a time gap with tail samples for use in high frequency bands, in accordance with various aspects of the present disclosure.

FIG. 6 is a diagram illustrating an example 600 of forming a time gap with tail samples for use in high frequency bands, in accordance with various aspects of the present disclosure. Example 600 shows components in a transmission chain of a transmitting device. The transmitting device is a wireless communication device such as a base station (e.g., base station 110 depicted in FIGS. 1-2) or a UE (e.g., UE 120 depicted in FIGS. 1-2). The transmitting device may communicate using a wireless link to a receiving device, which is a wireless communication device such as a base station (e.g., base station 110 depicted in FIGS. 1-2) or a UE (e.g., UE 120 depicted in FIGS. 1-2).

The transmitting device may include an S/P converter 608, a DFT component 610 that spreads an uplink shared channel, a subcarrier mapper component 612 that maps an output of the DFT spreading to sub-bands (e.g., physical subcarriers) of an output signal, an IFFT component 614 that performs an inverse FFT to prepare the uplink shared channel or output signal for transmission, a P/S converter 616, and a CP insertion component 618. The transmitting device may generate a first communication that includes CP 620 at a start of the first communication, data content 622, and tail samples 624 at an end of the first communication. The first communication may be a single symbol of a larger communication or may include multiple symbols.

As shown by reference number 630, the transmitting device may concatenate, before a DFT multiplexing operation by DFT component 610 for the first communication, modulated samples for data content and fill samples. The fill samples may be, for example, random modulated samples, repeated data modulation samples, reference signal samples, or low energy samples (e.g., zeros). In example 600, the fill samples are shown as zeros.

In some aspects, a transmitting device with faster switching capabilities may use non-zero samples. For example, such a transmitting device may use reference signal samples for channel estimation or use repeated data modulation samples to enhance data reception with symbol combining. Using non-zero samples may also involve a lower PAPR for increased coverage, because an energy difference between non-zero samples and data samples is less than an energy difference between zero samples and data samples.

As shown by reference number 635, the transmitting device may use CP insertion component 618 to add, after the DFT and IFFT operations, a CP to a start end of a first communication. The transmitting device may use a length for the CP and the FFT that is consistent from one symbol to another. The first communication may include CP 620 at a start of the first communication, data content 622, and tail samples 624 at an end of the first communication. If the fill samples have a length L, the DFT has a length M, and the IFFT has a length N, the tail samples of the first communication may have a length of L*N/M As shown by reference number 640, the transmitting device may transmit the first communication.

As indicated above, FIG. 6 is provided as an example. Other examples may differ from what is described with regard to FIG. 6.

Figure 7:
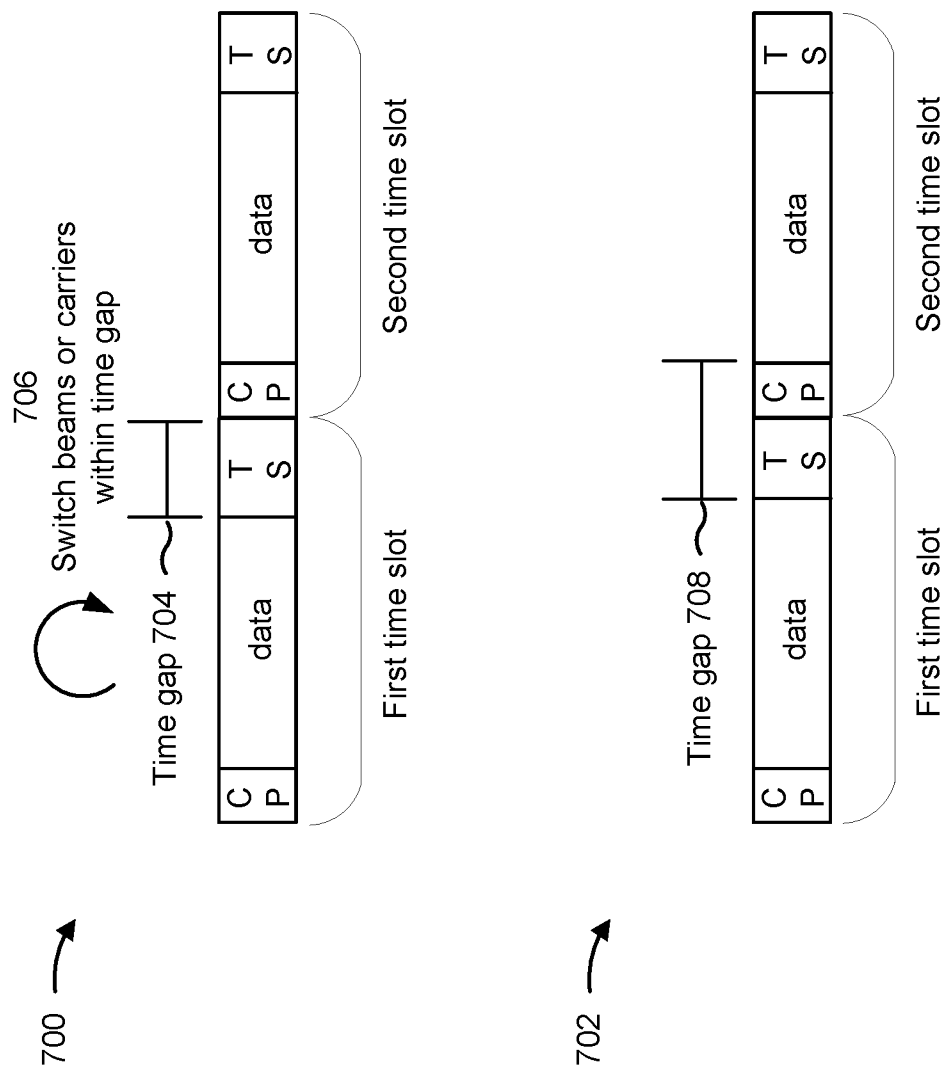
FIG. 7 is a diagram illustrating examples of forming a time gap with tail samples for use in high frequency bands, in accordance with various aspects of the present disclosure.

FIG. 7 is a diagram illustrating examples 700 and 702 of forming a time gap with tail samples for use in high frequency bands, in accordance with various aspects of the present disclosure.

Example 700 shows a time gap 704 formed by tail samples (TS) for a communication transmitted by a transmitting device in a first time slot and/or received by a receiving device in the first time slot. The first time slot may be for a single symbol, and the tail samples may form a sub-symbol gap. The first time slot may alternatively be for multiple symbols or other groups of samples. The receiving device may initiate a gap action. For example, as shown by reference number 706, the receiving device may switch beams or carriers during time gap 704. The receiving device may complete the beam or carrier switching within time gap 704. Alternatively, or additionally, the transmitting device may perform a gap action during time gap 704, such as switching beams or carriers.

Example 702 shows a time gap 708 formed by tail samples at an end of a first time slot and a CP at a start end of a second time slot that is subsequent to, or directly after, the first time slot. The receiving device may initiate and complete the gap action within time gap 708, which, in example 702, is extended into the second time slot. Combining tail samples and starting CP of two contiguous time slots provides for a larger time gap for beam or carrier switching at high frequencies. If each communication is generated with a DFT operation, adding some low energy samples (e.g., zeros), random modulated samples, or copied modulated samples before the DFT operation utilizes an existing mechanism that does not provide additional FFT complexity or CP overhead.

In some aspects, a gap action or another action may be initiated within the time gap, but not be completed within the time gap. For example, the gap action may start in the time gap but finish later in the symbol or in another symbol. In this case, a receiving device or transmitting device may still benefit from the extra time provided by the tail samples. In another example, an action may be initiated but may not be completed because a specified condition or threshold is achieved. An action may not be completed because of a detected failure or an undetected failure.

As indicated above, FIG. 7 provides some examples. Other examples may differ from what is described with regard to FIG. 7.

Figure 8:
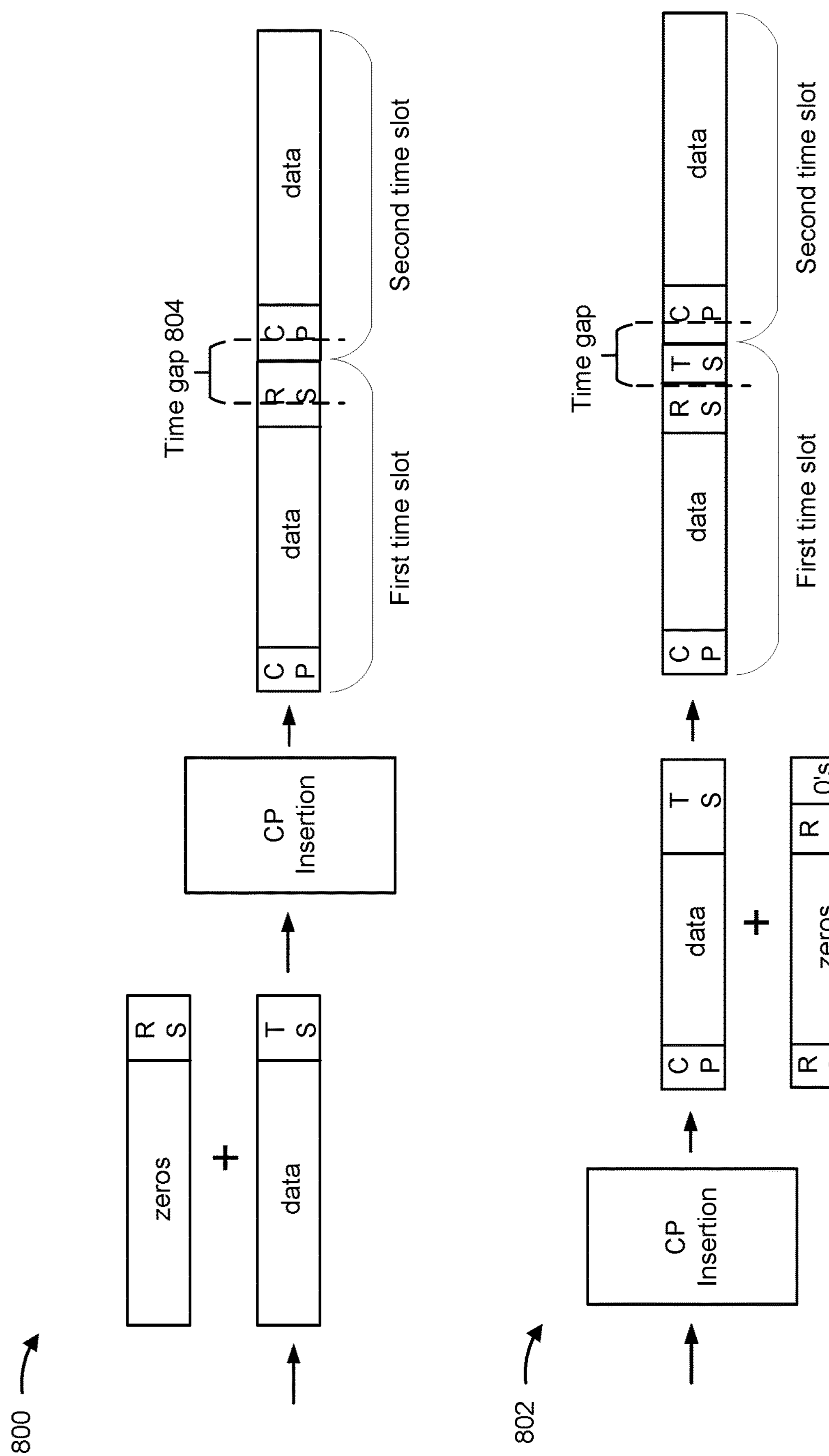
FIG. 8 is a diagram illustrating examples of forming a time gap with tail samples for use in high frequency bands, in accordance with various aspects of the present disclosure.

FIG. 8 is a diagram illustrating examples 800 and 802 of forming a time gap with tail samples for use in high frequency bands, in accordance with various aspects of the present disclosure.

If zeros (or other low energy samples) are used as fill samples, the tail samples may provide available space for adding other samples before transmission. Example 800 shows that a transmitting device may replace zero tail symbols with reference signal samples, such as after an IFFT operation. Replacing zero tail samples with reference signal samples may include adding reference signal samples to zero tail samples that emerge in a communication from a P/S converter (e.g., P/S converter 616). The reference signal samples may be added before CP insertion. A time gap 804 may be formed from the reference signal samples and a CP of the next communication. A receiving device may use the reference signal samples for timing, phase, or frequency estimations.

Example 802 may involve larger time gaps than example 800. Example 802 shows adding reference signal samples to zero tail samples after CP insertion. If the tail samples are longer in duration than the reference signal samples, some tail sample space may remain. This space may form a time gap with a CP of the next communication. In this way, a receiving device may use the reference signal samples for estimation purposes in addition to using a larger time gap for beam switching.

As indicated above, FIG. 8 provides some examples. Other examples may differ from what is described with regard to FIG. 8.

Figure 9:
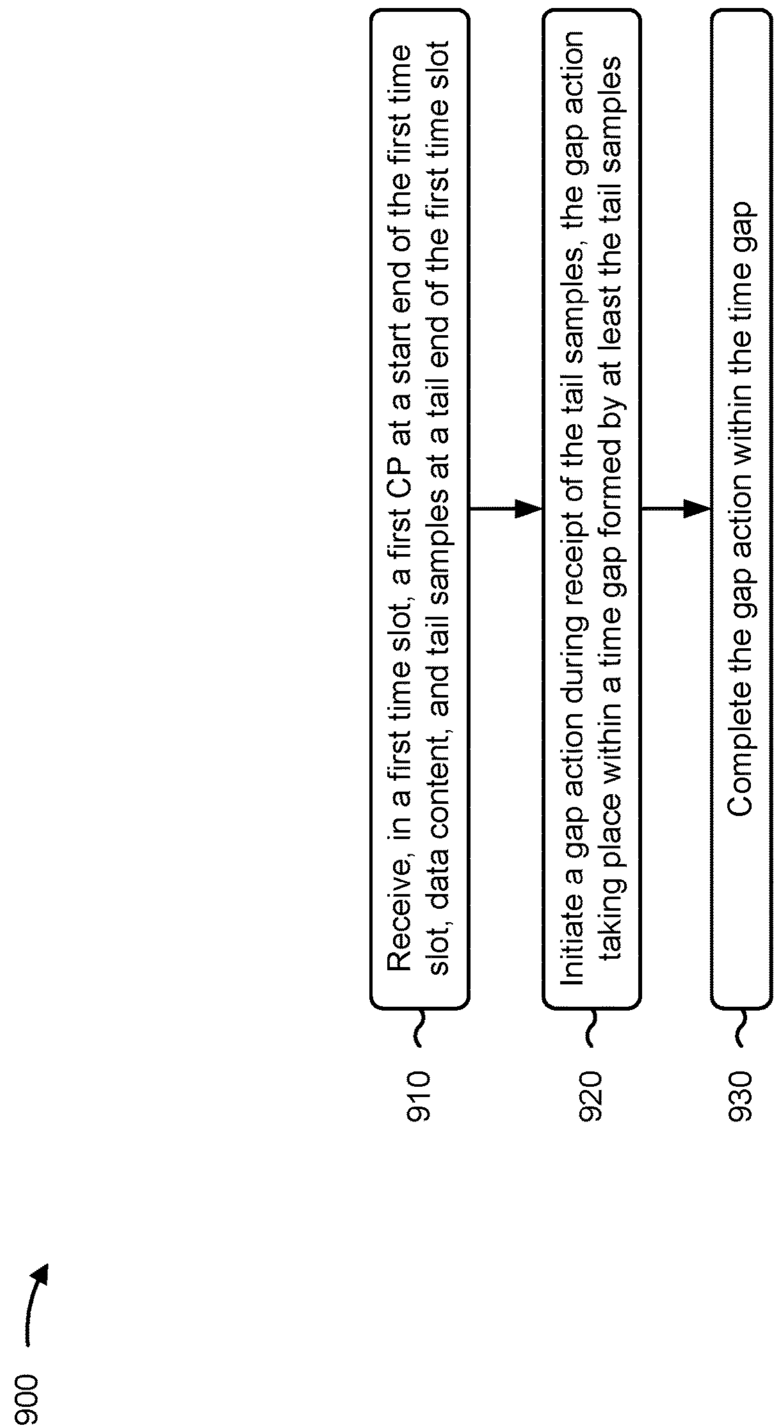
FIG. 9 is a diagram illustrating an example process performed, for example, by a wireless communication device that is a receiving device, in accordance with various aspects of the present disclosure.

FIG. 9 is a diagram illustrating an example process 900 performed, for example, by a wireless communication device that is a receiving device, in accordance with various aspects of the present disclosure. Example process 900 is an example where the wireless communication device (e.g., base station 110 or UE 120 depicted in FIGS. 1-3) performs operations associated with using a time gap with tail samples in high frequency bands.

As shown in FIG. 9, in some aspects, process 900 may include receiving, in a first time slot, a first CP at a start end of the first time slot, data content, and tail samples at a tail end of the first time slot (block 910). For example, the wireless communication device (e.g., using reception component 1102 depicted in FIG. 11) may receive, in a first time slot, a first CP at a start end of the first time slot, data content, and tail samples at a tail end of the first time slot, as described above.

As further shown in FIG. 9, in some aspects, process 900 may include initiating a gap action during receipt of the tail samples, the gap action taking place within a time gap formed by at least the tail samples (block 920). For example, the wireless communication device (e.g., using action component 1108 depicted in FIG. 11) may initiate a gap action during receipt of the tail samples, the gap action taking place within a time gap formed by at least the tail samples, as described above.

As further shown in FIG. 9, in some aspects, process 900 may include completing the gap action within the time gap (block 930). For example, the wireless communication device (e.g., using action component 1108 depicted in FIG. 11) may complete the gap action within the time gap, as described above. This may include completing a beam switch, a carrier switch, or a directional (uplink/downlink) switch.

Process 900 may include additional aspects, such as any single aspect or any combination of aspects described below and/or in connection with one or more other processes described elsewhere herein.

In a first aspect, the time gap is further formed by a second CP at a start end of a second time slot subsequent to the first time slot.

In a second aspect, alone or in combination with the first aspect, the gap action includes switching beams.

In a third aspect, alone or in combination with one or more of the first and second aspects, the gap action includes switching from downlink reception in the first time slot to uplink transmission in a second time slot subsequent to the first time slot.

In a fourth aspect, alone or in combination with one or more of the first through third aspects, a waveform for the first CP, the data content, and the tail samples is a single carrier frequency domain waveform.

In a fifth aspect, alone or in combination with one or more of the first through fourth aspects, the single carrier frequency domain waveform is a DFT-s-OFDM waveform.

In a sixth aspect, alone or in combination with one or more of the first through fifth aspects, the tail samples include samples with an energy that satisfies an energy threshold.

In a seventh aspect, alone or in combination with one or more of the first through sixth aspects, the tail samples include zeros.

In an eighth aspect, alone or in combination with one or more of the first through seventh aspects, the tail samples include random modulation samples.

In a ninth aspect, alone or in combination with one or more of the first through eighth aspects, the tail samples include samples for reference signals.

In a tenth aspect, alone or in combination with one or more of the first through ninth aspects, the tail samples include one or more repeated portions of the data content.

In an eleventh aspect, alone or in combination with one or more of the first through tenth aspects, the tail samples include repeated data modulation samples.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
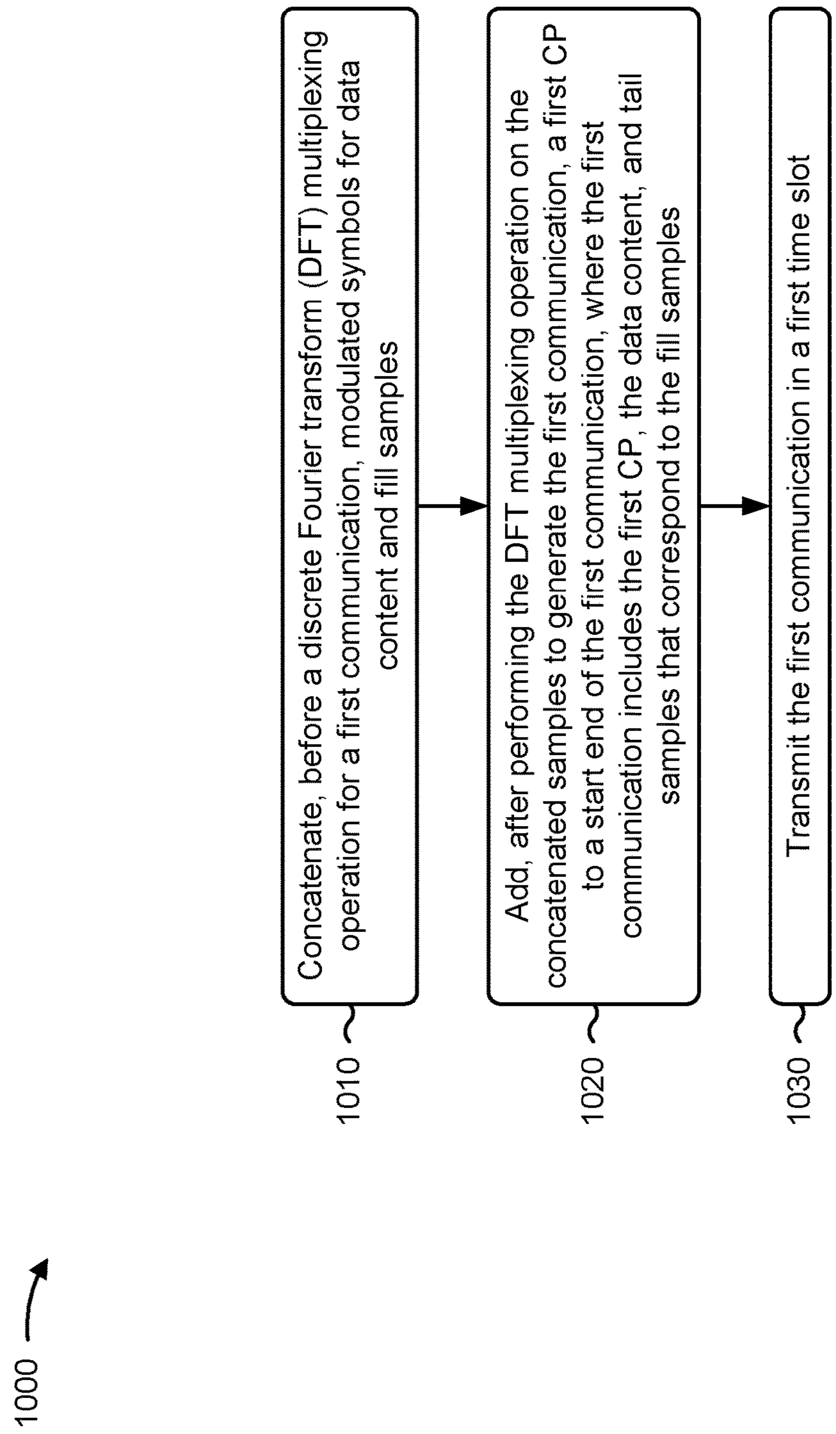
FIG. 10 is a diagram illustrating an example process performed, for example, by a wireless communication device that is a transmitting device, in accordance with various aspects of the present disclosure.

FIG. 10 is a diagram illustrating an example process 1000 performed, for example, by a wireless communication device that is a transmitting device, in accordance with various aspects of the present disclosure. Example process 1000 is an example where the wireless communication device (e.g., base station 110 or UE 120 depicted in FIGS. 1-3) performs operations associated with forming a time gap with tail samples for use in high frequency bands.

As shown in FIG. 10, in some aspects, process 1000 may include concatenating, before a DFT multiplexing operation for a first communication, modulated samples for data content and fill samples (block 1010). For example, the wireless communication device (e.g., using generation component 1208 depicted in FIG. 12) may concatenate, before a DFT multiplexing operation for a first communication, modulated samples for data content and fill samples, as described above.

As further shown in FIG. 10, in some aspects, process 1000 may include adding, after performing the DFT multiplexing operation on the concatenated samples to generate the first communication, a first CP to a start end of the first communication (block 1020). For example, the wireless communication device (e.g., using generation component 1208 depicted in FIG. 12) may add, after performing the DFT multiplexing operation on the concatenated samples to generate the first communication, first CP samples to a start end of the first communication, as described above. In some aspects, the first communication may include the first CP samples, the data content, and tail samples that correspond to the fill samples.

As further shown in FIG. 10, in some aspects, process 1000 may include transmitting the first communication in a first time slot (block 1030). For example, the wireless communication device (e.g., using transmission component 1204 depicted in FIG. 12) may transmit the first communication in a first time slot, as described above.

Process 1000 may include additional aspects, such as any single aspect or any combination of aspects described below and/or in connection with one or more other processes described elsewhere herein.

In a first aspect, the tail samples form a time gap for a gap action by a receiving device that takes place within the time gap.

In a second aspect, alone or in combination with the first aspect, the time gap is further formed by a second CP of a second communication in a second time slot that is subsequent to the first time slot.

In a third aspect, alone or in combination with one or more of the first and second aspects, a waveform for the first communication is a single carrier frequency domain waveform.

In a fourth aspect, alone or in combination with one or more of the first through third aspects, the single carrier frequency domain waveform is a DFT-s-OFDM waveform.

In a fifth aspect, alone or in combination with one or more of the first through fourth aspects, the tail samples have an energy that satisfies an energy threshold.

In a sixth aspect, alone or in combination with one or more of the first through fifth aspects, the fill samples include zeros.

In a seventh aspect, alone or in combination with one or more of the first through sixth aspects, process 1000 includes replacing, after an inverse fast Fourier transform operation, the tail samples with samples for reference signals.

In an eighth aspect, alone or in combination with one or more of the first through seventh aspects, the tail samples are replaced with the samples for reference signals before the first CP is added to the start end of the first communication.

In a ninth aspect, alone or in combination with one or more of the first through eighth aspects, the tail samples are replaced with one or more of zeros or the samples for reference signals after the first CP is added to the start end of the first communication.

In a tenth aspect, alone or in combination with one or more of the first through ninth aspects, the fill samples include random modulation samples.

In an eleventh aspect, alone or in combination with one or more of the first through tenth aspects, the fill samples include one or more repeated portions of the modulated samples for the data content.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
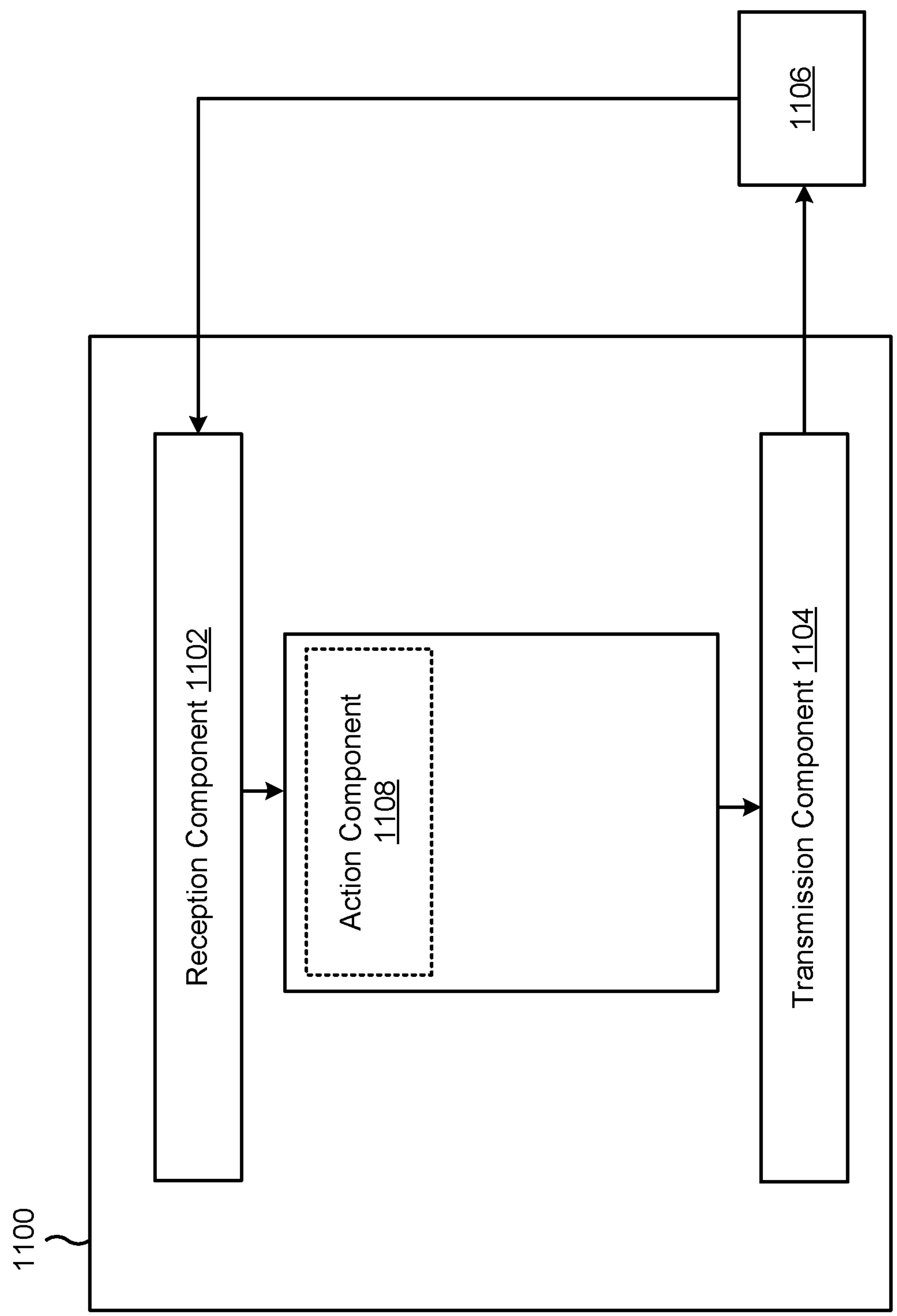
FIGS. 11-12 are block diagrams of example apparatuses for wireless communication, in accordance with various aspects of the present disclosure.

FIG. 11 is a block diagram of an example apparatus 1100 for wireless communication. The apparatus 1100 may be a wireless communication device, such as a UE or base station, or a wireless communication device may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another type of wireless communication device) using the reception component 1102 and the transmission component 1104. As further shown, the apparatus 1100 may include an action component 1108, among other examples.

In some aspects, the apparatus 1100 may be configured to perform one or more operations described herein in connection with FIGS. 1-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The reception component 1102 may receive, in a first time slot, a first CP at a start end of the first time slot, data content, and tail samples at a tail end of the first time slot. The action component 1108 may initiate a gap action during receipt of the tail samples, the gap action taking place within a time gap formed by at least the tail samples. The action component 1108 may complete the gap action within the time gap.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
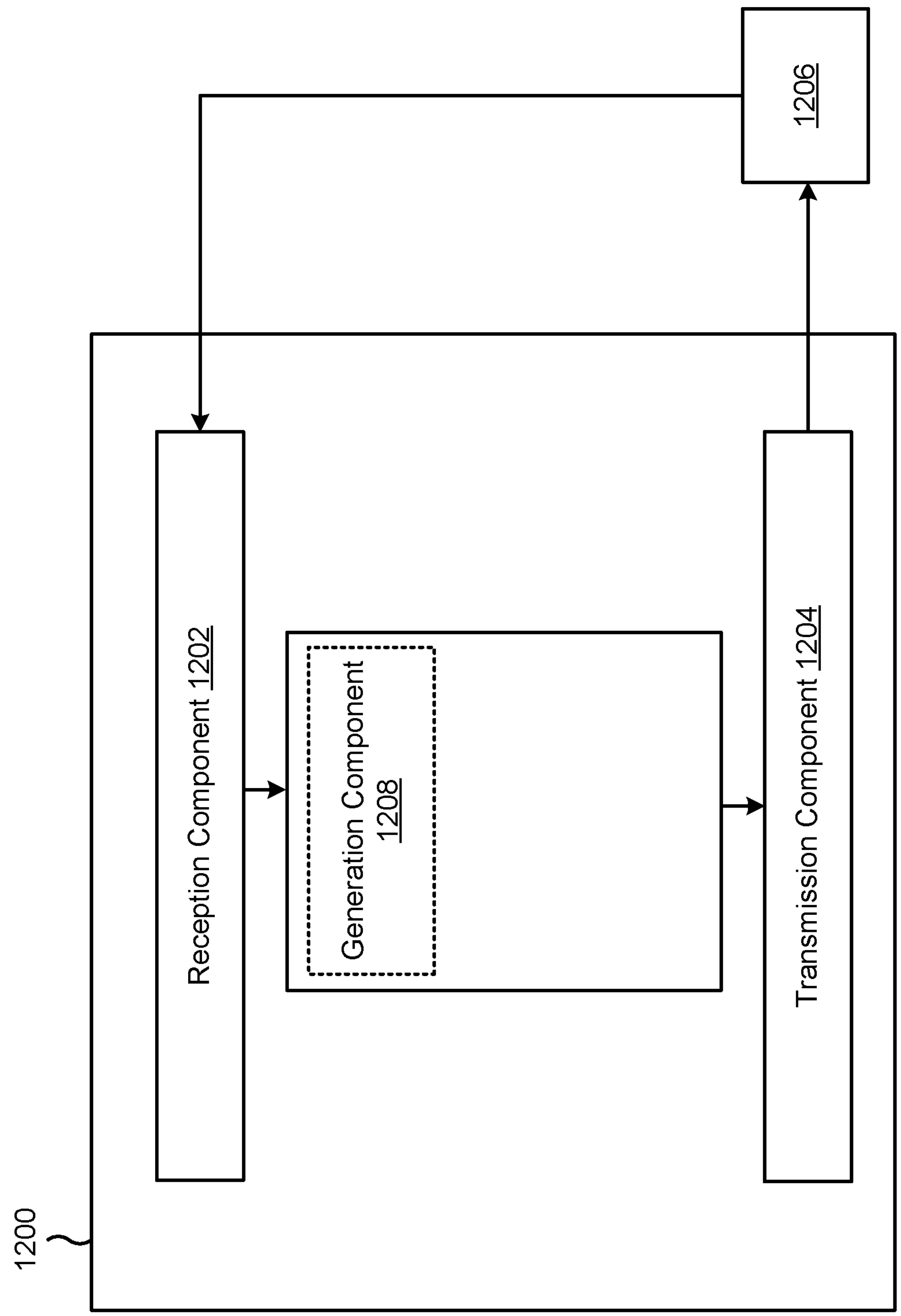

FIG. 12 is a block diagram of an example apparatus 1200 for wireless communication. The apparatus 1200 may be a wireless communication device, such as a UE or base station, or a wireless communication device may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another type of wireless communication device) using the reception component 1202 and the transmission component 1204. As further shown, the apparatus 1200 may include a generation component 1208, among other examples.

In some aspects, the apparatus 1200 may be configured to perform one or more operations described herein in connection with FIGS. 1-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the wireless communication device described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the wireless communication device described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the wireless communication device described above in connection with FIG. 2. In some aspects, the transmission component 1204 may be co-located with the reception component 1202 in a transceiver.

The generation component 1208 may concatenate, before a DFT multiplexing operation for a first communication, modulated samples for data content and fill samples. The generation component 1208 may add, after performing the DFT multiplexing operation on the concatenated samples to generate the first communication, a first CP to a start end of the first communication, where the first communication includes the first CP, the data content, and tail samples that correspond to the fill samples. The transmission component 1204 may transmit the first communication in a first time slot. The generation component 1208 may replace, after an inverse fast Fourier transform operation, the tail samples with samples for reference signals.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of aspects of the present disclosure:

Aspect 1: A method of wireless communication performed by a wireless communication device, comprising: receiving, in a first time slot, first cyclic prefix (CP) at a start end of the first time slot, data content, and tail samples at a tail end of the first time slot; initiating a gap action during receipt of the tail samples, the gap action taking place within a time gap formed by at least the tail samples; and completing the gap action within the time gap.

Aspect 2: The method of aspect 1, wherein the time gap is further formed by a second CP at a start end of a second time slot subsequent to the first time slot.

Aspect 3: The method of aspect 1 or 2, wherein the gap action includes switching beams.

Aspect 4: The method of any of aspects 1-3, wherein the gap action includes switching from downlink reception in the first time slot to uplink transmission in a second time slot subsequent to the first time slot.

Aspect 5: The method of any of aspects 1-3, wherein a waveform for the first CP, the data content, and the tail samples is a single carrier frequency domain waveform.

Aspect 6: The method of aspect 5, wherein the single carrier frequency domain waveform is a direct Fourier transform spread orthogonal frequency-division multiplexing (DFT-s-OFDM) waveform.

Aspect 7: The method of any of aspects 1-6, wherein the tail samples include samples with an energy that satisfies an energy threshold.

Aspect 8: The method of any of aspects 1-7, wherein the tail samples include zeros.

Aspect 9: The method of any of aspects 1-8, wherein the tail samples include random modulation samples.

Aspect 10: The method of any of aspects 1-9, wherein the tail samples include samples for reference signals.

Aspect 11: The method of any of aspects 1-10, wherein the tail samples include one or more repeated portions of the data content.

Aspect 12: The method of any of aspects 1-11, wherein the tail samples include repeated data modulation samples.

Aspect 13: A method of wireless communication performed by a wireless communication device, comprising: concatenating, before a discrete Fourier transform (DFT) multiplexing operation for a first communication, modulated samples for data content and fill samples; adding, after performing the DFT multiplexing operation on the concatenated samples to generate the first communication, a first cyclic prefix (CP) to a start end of the first communication, wherein the first communication includes the first CP, the data content, and tail samples that correspond to the fill samples; and transmitting the first communication in a first time slot.

Aspect 14: The method of aspect 13, wherein the tail samples form a time gap for a gap action by a receiving device that takes place within the time gap.

Aspect 15: The method of aspect 14, wherein the time gap is further formed by a second CP of a second communication in a second time slot that is subsequent to the first time slot.

Aspect 16: The method of any of aspects 13-15, wherein a waveform for the first communication is a single carrier frequency domain waveform.

Aspect 17: The method of aspect 16, wherein the single carrier frequency domain waveform is a direct Fourier transform spread orthogonal frequency-division multiplexing (DFT-s-OFDM) waveform.

Aspect 18: The method of any of aspects 13-17, wherein the tail samples have an energy that satisfies an energy threshold.

Aspect 19: The method of any of aspects 13-18, wherein the fill samples include zeros.

Aspect 20: The method of any of aspects 13-19, further comprising replacing, after an inverse fast Fourier transform operation, the tail samples with samples for reference signals.

Aspect 21: The method of aspect 20, wherein the tail samples are replaced with the samples for reference signals before the first CP is added to the start end of the first communication.

Aspect 22: The method of aspect 20, wherein the tail samples are replaced with one or more of zeros or the samples for reference signals after the first CP is added to the start end of the first communication.

Aspect 23: The method of any of aspects 13-22, wherein the fill samples include random modulation samples.

Aspect 24: The method of any of aspects 13-23, wherein the fill samples include one or more repeated portions of the modulated samples for the data content.

Aspect 25: An apparatus for wireless communication at a device, comprising a processor; memory coupled with the processor; and instructions stored in the memory and executable by the processor to cause the apparatus to perform the method of one or more aspects of aspects 1-24.

Aspect 26: A device for wireless communication, comprising a memory and one or more processors coupled to the memory, the memory and the one or more processors configured to perform the method of one or more aspects of aspects 1-24.

Aspect 27: An apparatus for wireless communication, comprising at least one means for performing the method of one or more aspects of aspects 1-24.

Aspect 28: A non-transitory computer-readable medium storing code for wireless communication, the code comprising instructions executable by a processor to perform the method of one or more aspects of aspects 1-24.

Aspect 29: A non-transitory computer-readable medium storing a set of instructions for wireless communication, the set of instructions comprising one or more instructions that, when executed by one or more processors of a device, cause the device to perform the method of one or more aspects of aspects 1-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device for wireless communication, comprising:
a memory; and
one or more processors coupled to the memory, the one or more processors configured to:
receive, in a first time slot:
a first cyclic prefix (CP) at a start portion of the first time slot,
data content, and
tail samples at a tail portion of the first time slot;
perform a gap action within a time gap formed by at least the tail samples, wherein, to perform the gap action, the one or more processors are configured to initiate the gap action during receipt of the tail samples; and
complete the gap action within the time gap.

2. The wireless communication device of claim 1, wherein the time gap is further formed by a second CP at a start portion of a second time slot subsequent to the first time slot.

3. The wireless communication device of claim 1, wherein, to perform the gap action, the one or more processors are configured to switch beams.

4. The wireless communication device of claim 1, wherein, to perform the gap action, the one or more processors are configured to switch from downlink reception in the first time slot to uplink transmission in a second time slot subsequent to the first time slot.

5. The wireless communication device of claim 1, wherein, to receive the first CP, the data content, and the tail samples, the one or more processors are configured to receive a single carrier frequency domain waveform including the first CP, the data content, and the tail samples.

6. The wireless communication device of claim 5, wherein the single carrier frequency domain waveform is a direct Fourier transform spread orthogonal frequency-division multiplexing (DFT-s-OFDM) waveform.

7. The wireless communication device of claim 1, wherein the tail samples include samples with an energy that satisfies an energy threshold.

8. The wireless communication device of claim 1, wherein the tail samples include zeros.

9. The wireless communication device of claim 1, wherein the tail samples include random modulation samples.

10. The wireless communication device of claim 1, wherein the tail samples include samples for reference signals.

11. The wireless communication device of claim 1, wherein the tail samples include one or more repeated portions of the data content.

12. The wireless communication device of claim 1, wherein the tail samples include repeated data modulation samples.

13. A wireless communication device for wireless communication, comprising:
a memory; and
one or more processors coupled to the memory, the one or more processors configured to:
concatenate, before a discrete Fourier transform (DFT) multiplexing operation for a first communication, modulated samples for data content and fill samples;
add, after generation of the first communication via the DFT multiplexing operation on the concatenated samples, a first cyclic prefix (CP) to a start portion of the first communication, wherein the first communication includes the first CP, the data content, and tail samples that correspond to the fill samples; and
transmit the first communication in a first time slot and a second communication in a second time slot, wherein a second CP of the second communication and the tail samples form a time gap.

14. The wireless communication device of claim 13, wherein the time gap is for a gap action to occur within the time gap.

15. The wireless communication device of claim 14, wherein the second communication is in a second time slot that is subsequent to the first time slot.

16. The wireless communication device of claim 13, wherein, to transmit the first communication, the one or more processors are configured to transmit a single carrier frequency domain waveform including the first communication.

17. The wireless communication device of claim 16, wherein the single carrier frequency domain waveform is a direct Fourier transform spread orthogonal frequency-division multiplexing (DFT-s-OFDM) waveform.

18. The wireless communication device of claim 13, wherein the tail samples have an energy that satisfies an energy threshold.

19. The wireless communication device of claim 13, wherein the fill samples include zeros.

20. The wireless communication device of claim 13, wherein the one or more processors are further configured to replace, after an inverse fast Fourier transform operation, the tail samples with samples for reference signals.

21. The wireless communication device of claim 20, wherein, to replace the tail samples with the samples for reference signals, the one or more processors are configured to replace the tail samples with the samples for reference signals before the first CP is added to the start portion of the first communication.

22. The wireless communication device of claim 21, wherein, to replace the tail samples with the samples for reference signals, the one or more processors are configured to replace the tail samples with one or more of zeros or the samples for reference signals after the first CP is added to the start portion of the first communication.

23. The wireless communication device of claim 13, wherein the fill samples include random modulation samples.

24. The wireless communication device of claim 13, wherein the fill samples include one or more repeated portions of the modulated samples for the data content.

25. A method of wireless communication performed by a wireless communication device, comprising:

receiving, in a first time slot:

a first cyclic prefix (CP) at a start portion of the first time slot, data content, and tail samples at a tail portion of the first time slot;

performing a gap action during within a time gap formed by at least the tail samples, wherein performing the gap action includes initiating the gap action during receipt of the tail samples; and completing the gap action within the time gap.

26. The method of claim 25, wherein the time gap is further formed by a second CP at a start portion of a second time slot subsequent to the first time slot.

27. The method of claim 25, wherein performing the gap action includes switching beams or switching from downlink reception in the first time slot to uplink transmission in a second time slot subsequent to the first time slot.

28. The method of claim 25, wherein the tail samples include one or more of samples with an energy that satisfies an energy threshold, zeros, random modulation samples, samples for reference signals, one or more repeated portions of the data content, or repeated data modulation samples.

29. A method of wireless communication performed by a wireless communication device, comprising:

concatenating, before a discrete Fourier transform (DFT) multiplexing operation for a first communication, modulated samples for data content and fill samples;

adding, after generation of the first communication via the DFT multiplexing operation on the concatenated samples, a first cyclic prefix (CP) to a start portion of the first communication, wherein the first communication includes the first CP, the data content, and tail samples that correspond to the fill samples; and transmitting the first communication in a first time slot and a second communication in a second time slot, wherein a second CP of the second communication and the tail samples form a time gap.

30. The method of claim 29, wherein the fill samples include zeros.

* * * * *